(12) United States Patent
Chejara

(10) Patent No.: US 7,861,192 B2
(45) Date of Patent: Dec. 28, 2010

(54) TECHNIQUE TO IMPLEMENT CLOCK-GATING USING A COMMON ENABLE FOR A PLURALITY OF STORAGE CELLS

(75) Inventor: Umesh Chandra Chejara, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 446 days.

(21) Appl. No.: 11/955,976

(22) Filed: Dec. 13, 2007

(65) Prior Publication Data

US 2009/0158076 A1 Jun. 18, 2009

(51) Int. Cl.
*G06F 17/50* (2006.01)
(52) U.S. Cl. ......................................... 716/1
(58) Field of Classification Search ................. 716/5–6, 716/1; 713/500; 711/100, 104, 149, 154, 711/167, 170, 179
See application file for complete search history.

(56) References Cited

U.S. PATENT DOCUMENTS

| | | | |
|---|---|---|---|
| 5,414,745 A | 5/1995 | Lowe | |
| 5,600,839 A | 2/1997 | MacDonald | |
| 5,625,807 A | 4/1997 | Lee et al. | |
| 5,892,373 A | 4/1999 | Tupuri et al. | |
| 6,624,681 B1 | 9/2003 | Loyer et al. | |
| 6,782,486 B1 | 8/2004 | Miranda et al. | |
| 6,832,327 B1 | 12/2004 | Magro et al. | |
| 2007/0156995 A1* | 7/2007 | Kaburlasos | 711/167 |

FOREIGN PATENT DOCUMENTS

EP 0644475 3/1995

OTHER PUBLICATIONS

U.S. Appl. No. 08/191,388, filed Feb. 2, 1994.
U.S. Appl. No. 09/376,730, filed Aug. 17, 1999.

* cited by examiner

*Primary Examiner*—Vuthe Siek
(74) *Attorney, Agent, or Firm*—Rory D. Rankin; Meryertons, Hood, Kivlin, Kowart & Goetzel, P.C.

(57) ABSTRACT

A system and method for providing clock gating while reducing area and power on an integrated circuit (IC) chip. An array of registers or memory cells may have a single clock gating circuit, rather than multiple circuits such as one clock gating circuit for each bit of storage. The single clock gating circuit may be larger in size than each of the multiple clock gating circuits, but the single clock gating circuit may still have less capacitive loading. A reduction in overall allocated area allows floorplanning to offer less congested signal routing. Clock generation circuitry may be configured to provide a clock signal from a last ungated stage to clock enabling circuitry. A power reduction control unit may be configured to determine when the last ungated stage clock waveform is enabled/disabled within the clock gating circuitry.

18 Claims, 8 Drawing Sheets

TECHNIQUE TO IMPLEMENT CLOCK-GATING USING A COMMON ENABLE FOR A PLURALITY OF STORAGE CELLS

BACKGROUND OF THE INVENTION

1. Field of the Invention

This invention relates to integrated circuits, and more particularly, to a clock gating circuit method for area and power reduction.

2. Description of the Relevant Art

An integrated circuit (IC) chip, such as a processor or a controller, includes a synchronization of events in order to move and process data and allow sub-blocks in the design to communicate with one another. A reference is needed to provide the synchronization across the chip. Usually an IC chip includes one or more clock signals, depending on the chosen methodology, to provide this reference. This clock signal may be derived from a phase locked loop (PLL) placed on- or off-chip and provide a voltage waveform used by storage elements within the IC chip.

Due to on-chip parasitics, such as resistance and, more crucially, capacitance, the clock waveform degrades over routing distance across the chip. The farther a receiver is located from a clock source, the worse the degradation may be. In order to improve the waveform, clock buffer circuits may be located at predetermined locations, or stages, across the chip. New reference clock signals are derived at each stage from the original reference clock signal. Each storage element should receive a new reference clock signal at the same time as other storage elements. There may be some error, but the amount of this error should lie within predetermined design constraints.

Another design requirement of IC chips is lowering power. Mobile devices especially require low-power circuit techniques due to a lack of cooling devices such as fans and due to being powered by batteries. One low-power technique is the ability to disable a clock signal in a sub-block or an array when the internal circuitry is not required to perform work for an extended amount of time. Later, when the period of inactivity has ended, the clock signal is enabled again. An enable signal may be routed to a clock-gating circuit in order to perform this power-saving technique.

However, even if sub-blocks and arrays have the ability to enable and disable their respective clock signals, the total IC chip power consumption may still be high. Dynamic power of an IC chip is directly proportional to the clock frequency, the square of the operating voltage, and the on-die capacitance being charged and discharged. If the clock frequency is reduced, the IC chip power would be reduced. However, circuit activity, and thus performance, would be reduced also, and IC chip designs continue to demand higher performance. Another method to reduce power consumption is to reduce the operating voltage. Although, this method also reduces the amount of current used to charge and discharge circuit nodes, which reduces the switching speeds of circuits. Again, chip performance is reduced.

A third method to reduce chip power is to reduce the on-chip capacitance. The clock buffer circuits may be numerous on the IC chip. These clock buffer circuits, unlike circuits following a clock gated circuit, need to drive a signal every clock cycle. Many of the clock buffer circuits may be large in size due to the large capacitive load they need to drive. The clock buffer circuits drive the signal route capacitance and the logic-gate input capacitance of storage elements and combinatorial logic. Large clock buffer circuits require more current drawn from the power supply, and therefore consume more power. A common design problem is the amount of capacitance the clock buffer circuits need to drive as this greatly increases the power consumption of the chip. The spacing, width, and length of signal routes may be studied and adjusted in order to reduce the parasitic capacitance of the routes. Attempts may be taken to reduce the gate widths of the storage elements and combinatorial logic. However, both the signal route parasitic capacitance and combinatorial gate input widths may still be great due to aggressive performance goals.

Although clock gating circuits may be used to disable the clock signals to various sections of the chip in order to help reduce clock power, these same circuits may increase the logic-gate input capacitance to be driven by the clock buffer circuits. Also, these same circuits may crowd clock rows designated for clock signal routing, which leads to increased chip area and increased parasitic signal capacitance, since this route spacing is decreased.

In view of the above, an efficient method for clock gating that reduces on-chip area and power is desired.

SUMMARY OF THE INVENTION

Systems and methods for providing clock gating are contemplated.

In one embodiment, an IC processor system is provided comprising a plurality of arrays, clock generation circuitry, and a power reduction control unit. Each array may comprise storage element cells and clock enabling circuitry. The storage element cells may include flip-flops, six-transistor memory cells, or other. The clock enabling circuitry may include a single clock gating circuit. The clock generation circuitry may be configured to provide a clock signal waveform from a last ungated stage to the clock enabling circuitry. The power reduction control unit may be configured to determine when the last ungated stage clock waveform is enabled/disabled within the clock gating circuitry. The single clock gating circuit within an array may receive the last ungated stage clock waveform, receive a common enable signal corresponding to the storage element cells, and provide a clock signal waveform to the storage element cells in response to the last ungated stage clock waveform is asserted and the common enable signal is asserted. Having a single clock gating circuit in an array, rather than a clock gating circuit for each storage element cell may reduce the power requirement and the signal routing area of the array.

In an alternative embodiment of the invention, a method is provided to convey a clock signal waveform from a last ungated stage of a clock generation circuitry to a clock enabling circuitry within an array. A determination is made concerning when the last ungated stage clock waveform is enabled/disabled within the clock gating circuitry. A single clock gating circuit for each array is used by the method to receive the last ungated stage clock waveform. Also, the circuit may receive a common enable signal corresponding to storage element cells within the array. The circuit may provide a clock signal waveform to the storage element cells in response to the last ungated stage clock waveform is asserted and the common enable signal is asserted.

Figure 1:
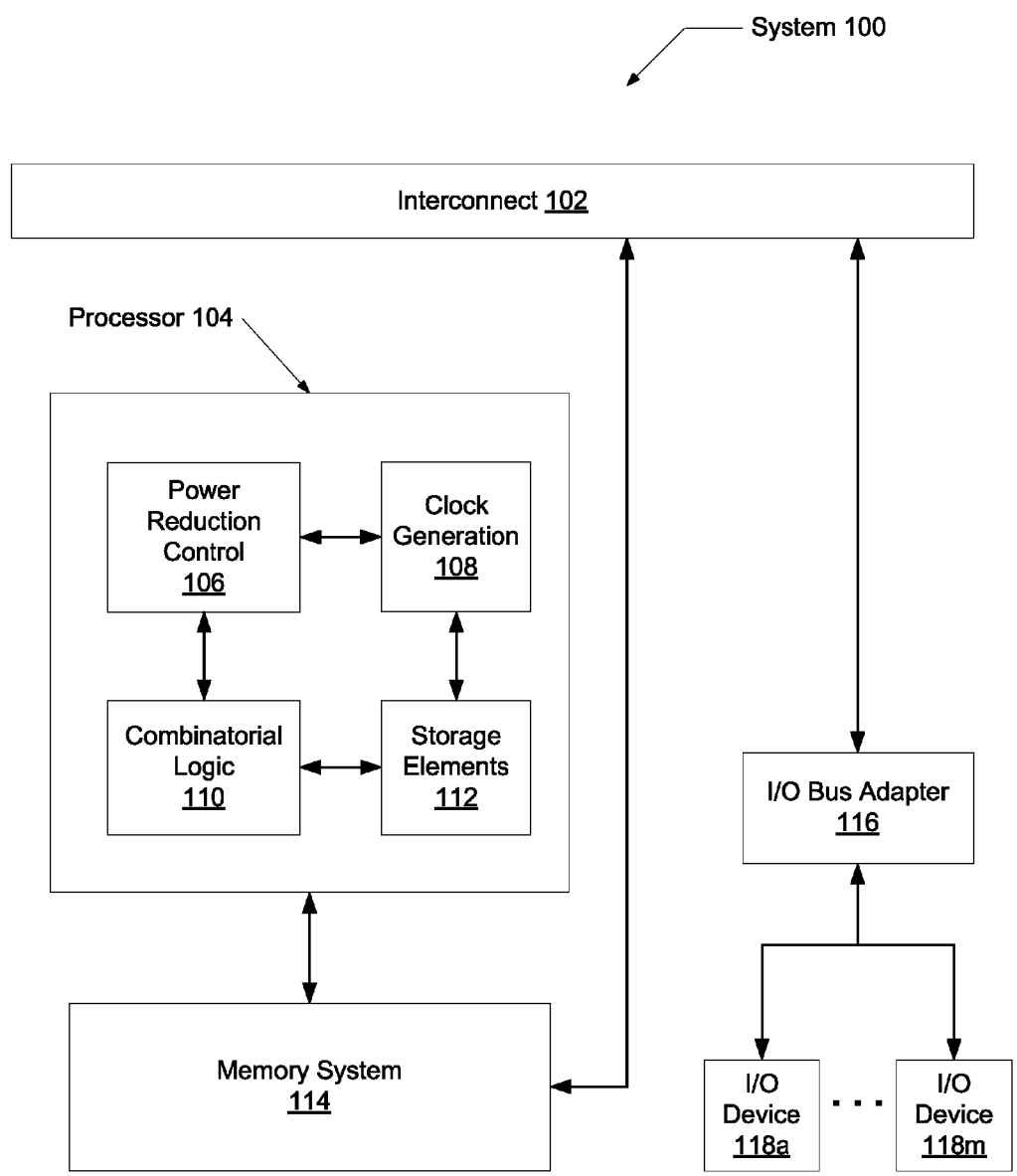
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a computing system 100 is shown. In one embodiment, system 100 may be used for a processor within a mobile hand-held device powered by a battery. Interconnect 102 may include any suitable technology and communication protocols. I/O bus adapter 116 provides an interface for I/O devices 118a-118m to memory system 114 and to processor 104. As used herein, elements referred to by a reference numeral followed by a letter may be collectively referred to by the numeral alone. For example, I/O devices 118a-110m may be collectively referred to as I/O devices 118. I/O devices 118 may include peripheral network devices such as printers, keyboards, monitors, cameras, card readers, hard disk drives and otherwise.

Memory system 114 may have a memory hierarchy that begins with multiple levels of caches. Although memory is shown outside of processor 104 here, in other embodiments, a first-level cache or other parts of a memory hierarchy may be included in processor 104. A translation lookaside buffer (TLB) may be included for each level of caches for address matching of the requested memory line. Below the cache hierarchy may be memory controllers to interface with lower-level memory that may comprise other levels of cache on the die outside the microprocessor, dynamic random access memory (DRAM), dual in-line memory modules (dimms) in order to bank the DRAM, a hard disk, or a combination of these alternatives.

One or more processors 104 may be included in system 100 and each processor 104 may include one or more processor cores. In one embodiment, memory system 114 may be split into multiple segments with a segment of memory system 114 coupled to each of the multiple processors 104. Various embodiments may be chosen for the implementation of processor 104 and its cores. Each core may include a superscalar microarchitecture with a multi-stage pipeline. In some embodiments, a multi-stage pipeline may perform out-of-order execution of instructions. Also, each core may be configured to execute instructions for one or more threads.

These cores may be logically split into blocks. Pipeline stages incorporate both combinatorial logic and storage elements such as flip-flops, latches, and register files. Although, the logic and storage elements may be physically placed in alternating stages according to a floorplan of the chip, they are shown logically in separate groups as combinatorial logic 110 and storage elements 112. A clock generation block 108 may be used to create a clock distribution network for clock signal distribution across the IC chip. Various embodiments, such as an H-tree, balanced routing distribution or other may be used to implement the clock distribution with low skew. Power reduction control unit 106 may be used to send control signals across the chip in order to turn off certain portions of the chip during a period of non-use of those portions. The disabling of a clock signal to a circuit during a period of non-use may be referred to placing the circuit in sleep mode. A wake-up mode is used to once again enable the clock signal to the circuit when it is determined that the circuit needs to be used again.

Figure 2:
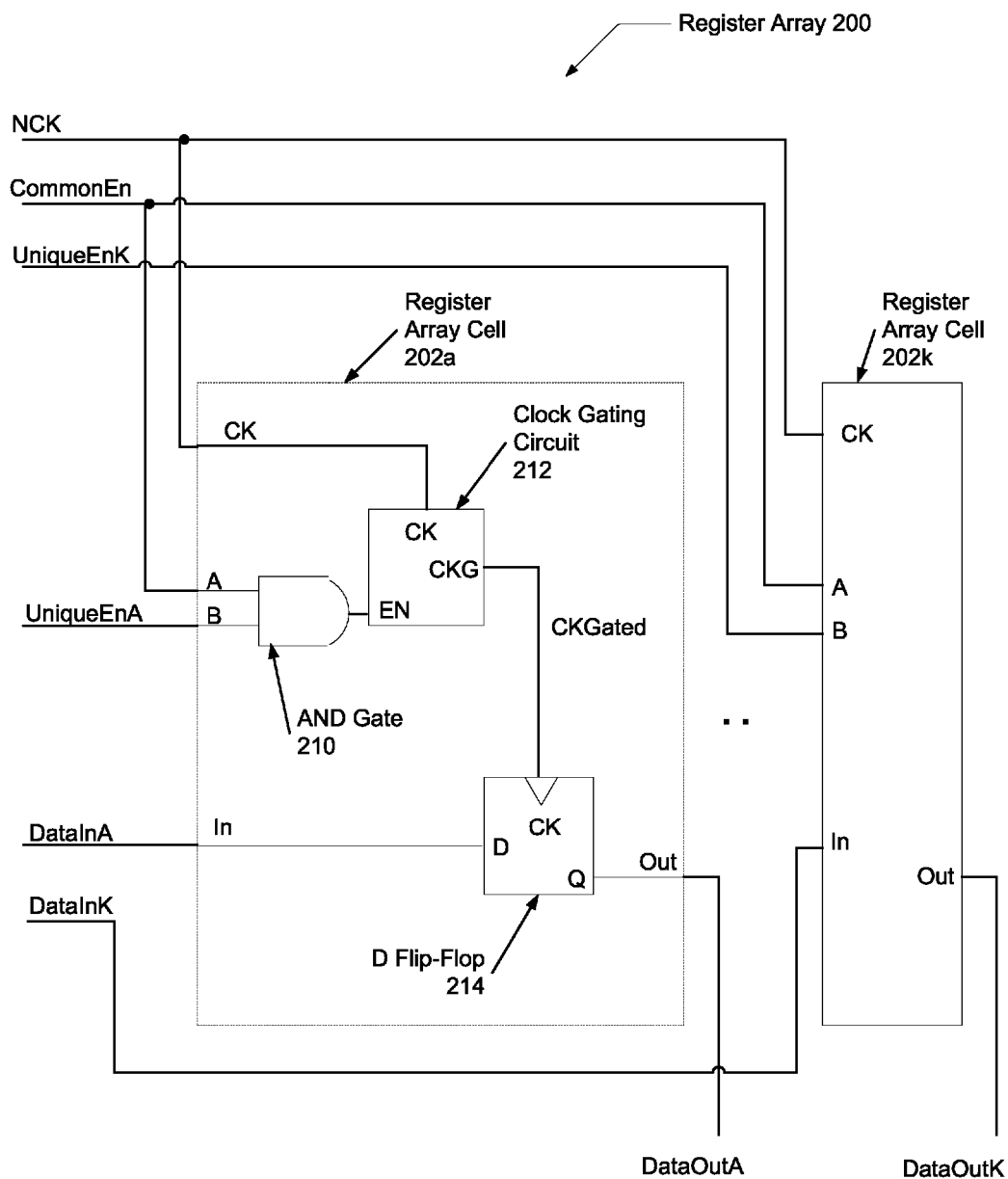
FIG. 2 is a generalized block diagram illustrating one embodiment of a register array.

FIG. 2 illustrates one embodiment of a clock enabled register array 200. In one embodiment, an array of 1-bit register cells 202 may be used to implement a multi-bit picker, scanner, or other on a processor. A D flip-flop 214 may be used to provide the storage of the 1-bit per cell. Each cell receives a 1-bit data value input, such as DataInA for cell 202a and DataInK for cell 202k. The data value outputs are DataOutA and DataOutK, respectively. Alternative embodiments may use another type of storage element such as another type of flip-flop. Each bit of the array in cells 202 may be set or reset on an independent basis. This independence allows each bit of cells 202 to be placed into a sleep mode independent of the other bits. Cells 202 may be located in a sub-block according to floorplanning of the chip. This sub-block may receive a clock signal, NCK, from a clock buffer circuit located at the final stage either prior to or within the sub-block depending on the design.

In one embodiment, a clock gating circuit (CGC) 212 may be used to provide a gated clock to flip-flop 214. A gated clock is a clock signal that may be enabled and disabled based on power management control logic. Here, the signal CKGated is derived from NCK outside the cell. The internal circuitry of CGC 212 will be shown later. Here, the clock input of CGC 212, CK, which is NCK routed to all cells 202, is a consistently transitioning clock waveform from a last stage clock buffer circuit. When NCK has a logic low value, CKGated has a logic low value. When NCK has a logic high value, CKGated will have a logic high value if the input signal EN has a logic high value. Otherwise, if the input signal EN has a logic low value, then CKGated remains at a logic low value.

In one embodiment, the logic AND gate 210 provides a qualified enable signal to CGC 212. Inputs to the AND gate 210 include a global enable signal, CommonEn, that is routed to all cells 202, and a local enable signal, UniqueEnA, that is routed only to cell 202a. Another local signal, UniqueEnK, is routed to cell 202k. The local enable signals allow individual bit-wise control of the clock to these cells. The global enable signal allows control of the clock to the entire array.

The clock buffer circuit that drives global clock signal, NCK, at a minimum, sees the capacitive load of the signal route to each cell 202 and sees the capacitive load of the CK input of CGC 212 within each cell 202. This accumulative load may greatly increase the size of this clock buffer circuit. Also, the combination of AND gate 210 and CGC 212 in each cell 202 requires allocated space in the floorplanning of register array 200.

Figure 3:
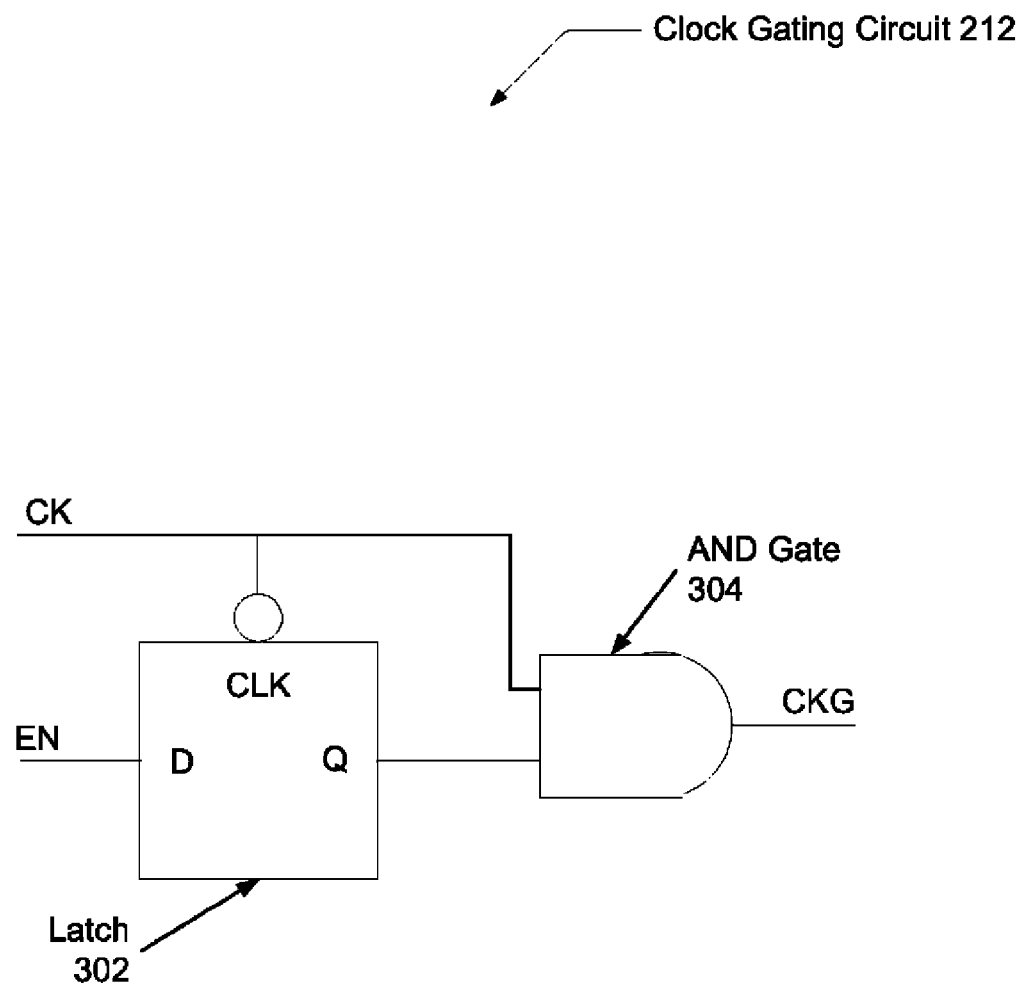
FIG. 3 is a generalized block diagram illustrating another embodiment of a clock gating circuit.

FIG. 3 depicts a generalized block diagram of CGC 212 used within a cell of the above described register array. An AND gate 304 receives both a transitioning clock input signal, CK, and the output of a level-sensitive latch 302. Latch 302 receives an enable signal as an input, which may be held to a logic high or low value for at least a clock cycle. In one embodiment, the enable signal may be an output of a flip-flop. When the input signal CK has a logic low value, the output signal CKG will have a logic low value regardless of the value of the output of latch 302. When the input signal CK has a logic high value, the output signal CKG will have the same value as the output of latch 302.

Figure 4:
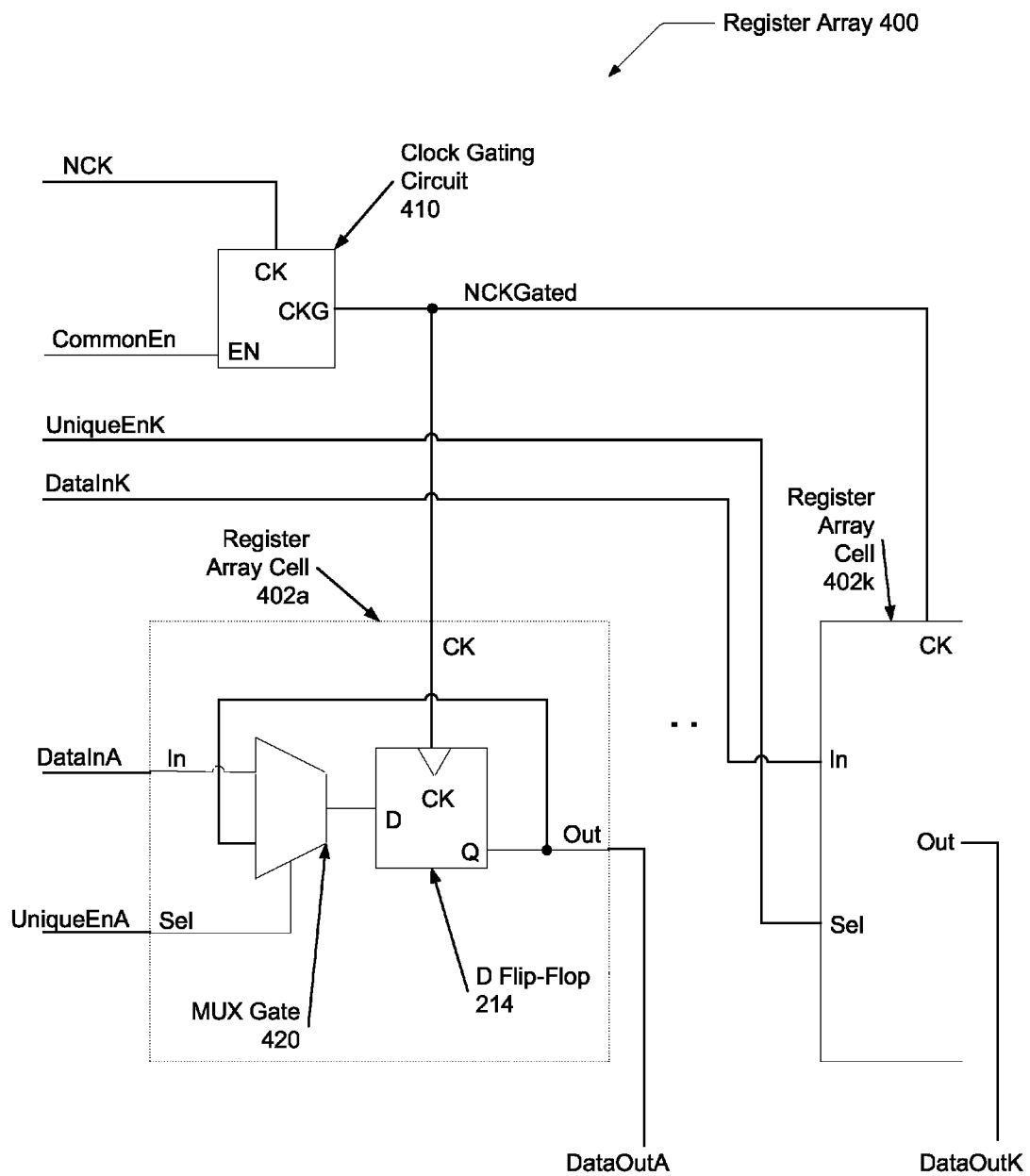
FIG. 4 is a generalized block diagram illustrating one embodiment of a register array built by a method to reduce power and area of clock enabled circuits.

Turning now to FIG. 4, a generalized block diagram of a clock enabled register array 400 is shown. In one embodiment, an array of 1-bit register cells 402 may be used to implement a multi-bit picker, scanner, or other on a processor similarly as clock enabled register array 200 shown in FIG. 2. As with register array 200, a D flip-flop 214 may be used to provide the storage of the 1-bit per cell. Each cell receives a 1-bit data value input, such as DataInA for cell 402a and DataInK for cell 402k. The data value outputs are DataOutA and DataOutK, respectively. Each bit of the array in cells 402 may be set or reset on an independent basis. A difference between cells 402 and cells 202 is the enabling/disabling of the clock signal occurs outside of cells 402, rather than inside. CGC 410 is used to provide a gated clock to all cells 402. Unlike register array 200, the clock buffer circuit that drives global clock signal NCK for register array 400 only sees the smaller capacitive load of the signal route to CGC 410 and the capacitive gate load of the CK input of CGC 410. This total capacitive load is much smaller than the total capacitive load driven by a clock buffer circuit driving NCK in register array 200.

Cells 402 have a decision-making device, such as mux gate 420, which replaces AND gate 210 and CGC 212 of cells 202. For cell 402a, mux gate 420 is used to either provide new data, DataInA, to the flip-flop 214 or to recycle the contents of flip-flop 214. Additionally, the combination of mux gate 420 and flip-flop 214 requires less area within cell 402a than the circuitry of cell 202a. Thus, when comparing the design of register array 400 to register array 200, the design of register array 400 has a smaller capacitive load of signal route NCK, which reduces the size of the corresponding clock buffer circuit driving signal NCK; and register array 400 requires less area for cells 402, which allows for more area to be used for signal route requirements (i.e. width, spacing, shielding); and the power requirement for register array 400 may be lower due to the lower capacitive load of signal NCK, the smaller sized driving clock buffer circuit for signal NCK, and the smaller sized cells 402.

In an alternative embodiment, both register array 200 and register array 400 may not have local enable signals, such as UniqueEnableA. Both arrays may have each bit of the array only clock enabled together with signal CommonEn. In this case, the floorplanning strategy used for register array 400 described above may still be used with slight modifications. For example, mux gate 420 may not be used and the input data, DataInputA, used for cell 402a may be directly connected to the input of flip-flop 214.

Figure 5:
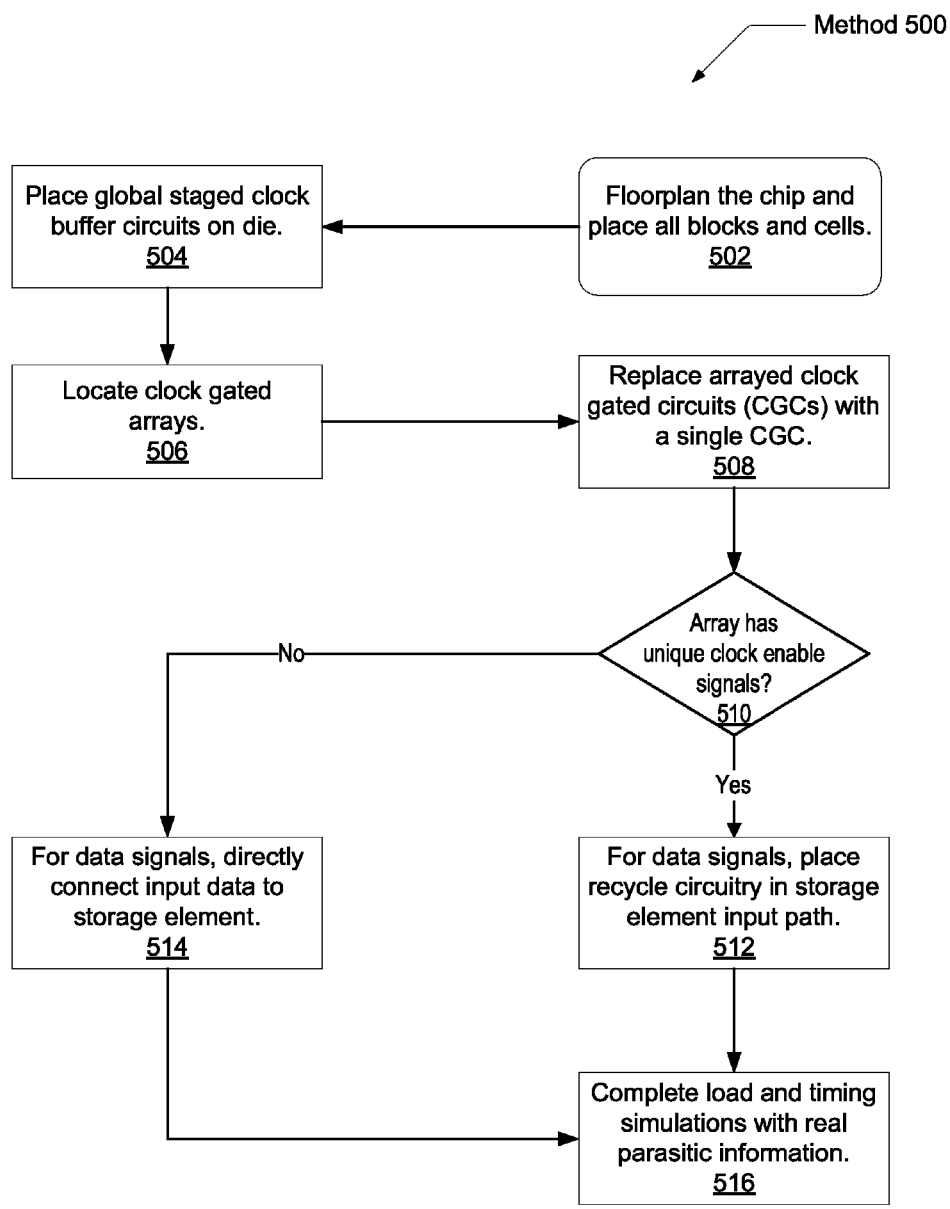
FIG. 5 is a flow diagram of one embodiment of a method for reducing power and area of clock enabled circuits on an integrated circuit (IC) chip.

FIG. 5 illustrates one embodiment of a method for reducing power and area of clock enabled circuits on an integrated circuit (IC) chip. Floorplanning of an IC chip occurs in block 502. All blocks are placed on the chip die and cells are placed within blocks. At this point in the design, actual routing of all signals may not be completed, but routing distances and metal layers are known from cell and block placement and from routing methodology. Local clock routing (i.e. wire width, spacing, shielding) within a block may be known. In block 504, global clock routing between staged clock buffer circuits is known from both distances between placed clock buffer circuits and between placed last stage clock buffer circuits and placed blocks. The latter distance and connections to block(s) provides an estimate of the capacitive load seen by the last stage clock buffer circuit that drives a signal such as NCK described above.

Finding clock gated arrayed elements is done in block 506. Clock gated arrayed elements may include storage elements such as flip-flops, a six-transistor memory cell used in register files, or other. The arrayed clocked elements may be used to store data in pipeline stages, to store data to be written to a register file, to store status information and data within a register file, or other. These arrays receive a clock signal to each storage element gated by at least a common enable signal. The common enable signal is used for power savings. It may be used to disable the clock signal to the array when the array is found to be in an idle state.

In one embodiment, a CGC may be included in each 1-bit storage element cell, such as in cells 202, of the array. In an alternative embodiment, the CGC may be included in a separate row of CGC's above or below the row of 1-bit storage element cells. In another embodiment, the two described implementations may be on placed as columns, rather than rows in the floorplan. Also, at this point, a unique enable signal may not exist, and AND gate 210 may not be included. Whether or not a unique enable signal exists, the multiple CGC's may be removed and replaced by a single CGC that drives a gated clock to the entire array in block 508. This is similar to removing CGC 212 from cells 202 and placing CGC 410 to drive the new cells 402. Whether or not a unique enable signal exists, the single CGC does not receive the unique enable signal as an input.

If the clock gated array includes unique clock enable signals in addition to the common enable signal (decision block 510), then each storage element cell of the array may need to be modified. Decision making circuitry, such as mux gate 420 in cells 402, may be added to each storage element in block 512 in order to potentially recycle the array's contents. A unique clock enable signal may correspond to 1-bit of the array, or it may correspond to a subset of the array, such as 4 bits of a 16-bit array. The decision making device may receive as inputs the input data, such as DataInA in cell 202a, that is received by the storage element cell and the unique enable signal. Additionally, the device may receive the contents of the storage element as an input. The device decides whether to drive the storage element's contents or the new data input to the storage element within the cell.

If the clock gated array does not include unique enable signals in addition to the common enable signal (decision block 510), then there is no need for a decision making device within a cell and the input data may be directly connected to the storage element within the cell in block 514. Both circuitry that was modified and circuitry not modified may be routed, parasitic extraction may be done, and timing analysis performed in block 516. Due to the modifications, there may be more area for routing signals due to the reduced area of the storage element cells and the parasitic loading of the gated clock signals may be reduced. Operating power may be decreased due to the reduction in area and clock signal loading.

Figure 6A:
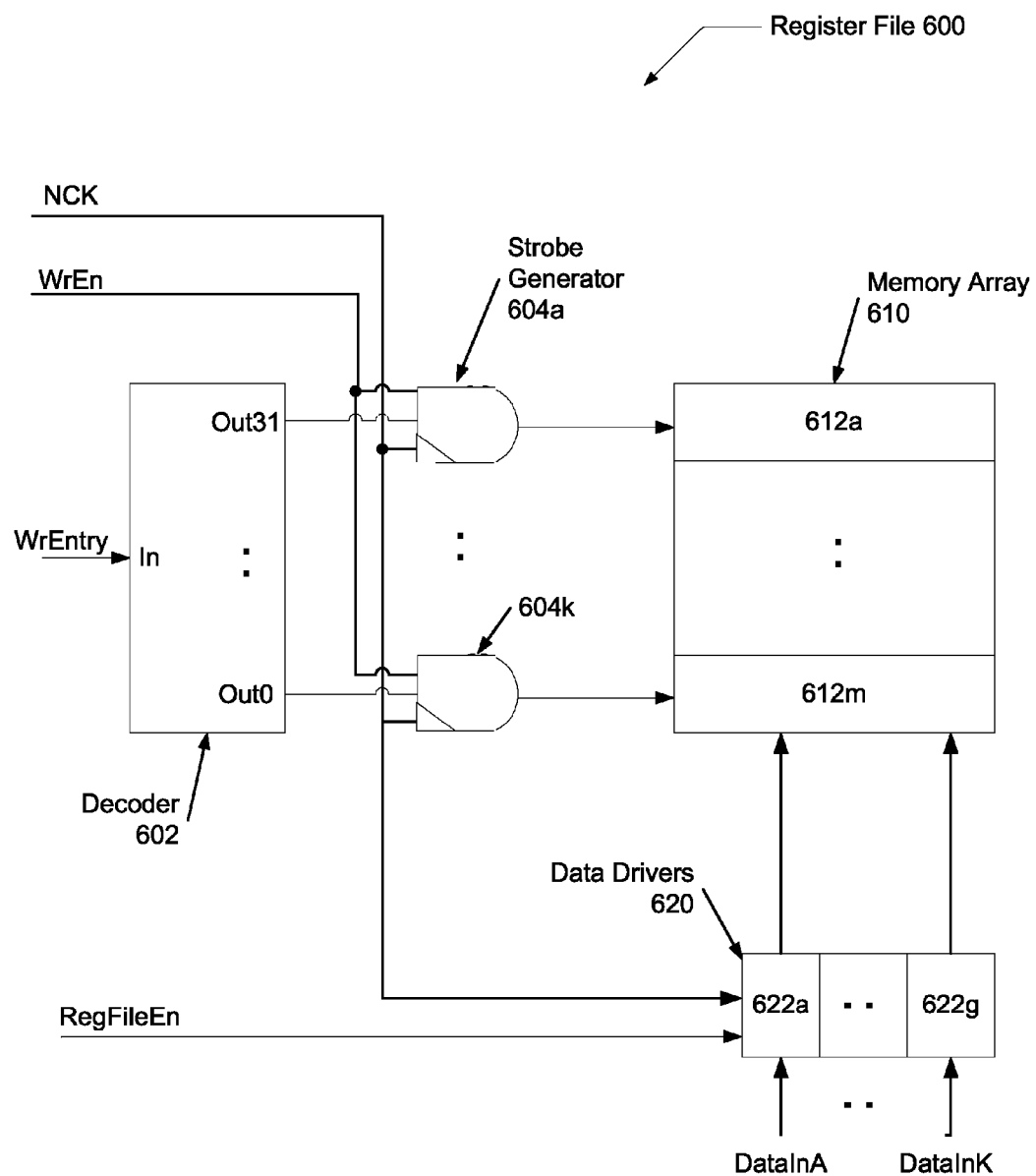
FIG. 6A is a generalized block diagram illustrating one embodiment of a register file.

Another example of method 500 may include modifying a register file. Turning now to FIG. 6A, a generalized block diagram of a register file 600 is shown. In one embodiment, register file 400 may be used for data storage such as a load-store unit that holds the addresses and data of load and store operations within a microprocessor. Each entry 612 of memory array 410 may hold status information, an address, and data for a load or store operation. In one embodiment, each bit of information stored in entry 612 may use a six-transistor memory cell configuration. Each memory cell may have one or more read ports, one or more write ports, and one or more content-addressable-memory (CAM) ports used for comparisons. For simplicity, in the embodiment shown in FIG. 6A, only a write operation is illustrated. However, similar circuitry exists for the read and CAM operations.

A decoder 602 receives a write operation entry signal, WrEntry, from control logic. This value determines which entry 612 of memory array 610 is going to be written. Decoder 602 will assert one of the output signal lines corresponding to the input value of WrEntry. This signal acts as an additional qualifying enable signal. Although within a column of memory array 610, such as bit 17, the decoder output selects only one entry within the column of bits, it is not thought of as a unique enable signal. The decoder output qualifies the entire row within the selected entry 612 and not a single bit or a subset of bits. For example, the decoder output does not enable only 4 bits of a 32-bit entry 612a. All 32 bits of entry 612a will be enabled. A write enable signal, WrEn, is asserted when a write operation is to be performed. This signal acts as a common enable signal similar to CommonEn in FIG. 2.

Register file 600 may receive a clock signal, NCK, from a clock buffer circuit located at a final stage either prior to or within the sub-block containing the register file. The clock signal NCK is input to each write strobe generator 604. For a strobe generator 604, when all the inputs have a logic high value, the output signal has a high value and one entry 612 will be written with new data stored in the data drivers 620. Data drivers 620 has an entry 622 or each bit to be written in memory array 610. The data in data drivers 620 may be an address and the data for a load or store operation. Also, data drivers 620 may receive an enable signal, RegFileEn, that may be used to disable the clock signal, NCK, for the storage elements within each entry 622 for power savings. If register file 600 is to be disabled, the signals RegFileEn and WrEn may be deasserted for this purpose.

Figure 6B:
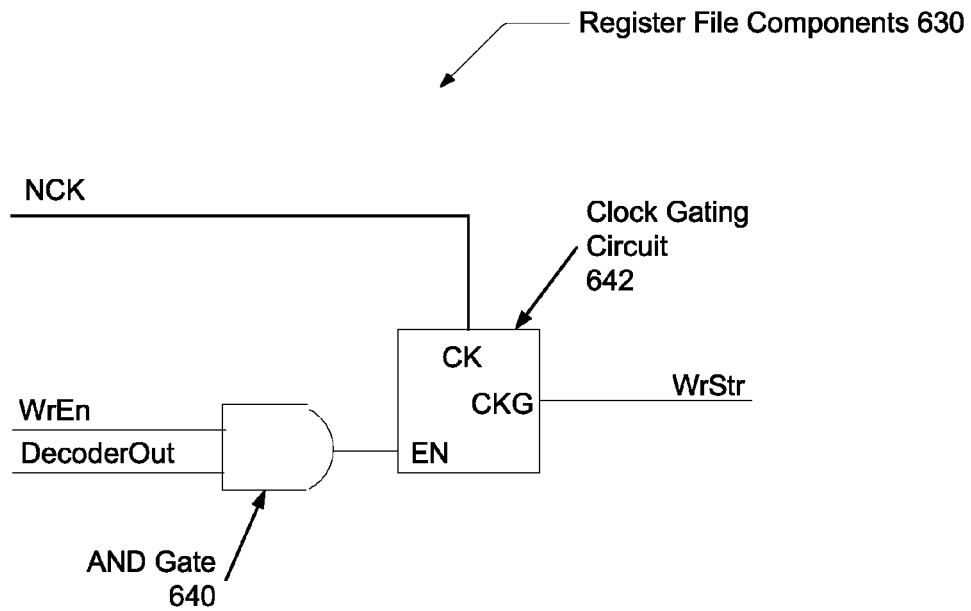
FIG. 6B is a generalized block diagram illustrating one embodiment of a write strobe generator.

FIG. 6B illustrates one embodiment of a write strobe generator 604 used in register file 600. This circuit is used for each entry of memory array 610. The input signal Decoder-Out is asserted high for an entry when that entry is chosen to have data written to it. The input signal WrEn is asserted high when a write operation is to occur within register file 600. The input signal NCK is the clock input signal. A clock gating circuit 642 is used to provide an asserted high signal to register file 600 when the input enable signals and the clock signal have a logic high value. In alternative embodiments, a buffer circuit, such as two CMOS inverters, may follow CGC 642.

Figure 6C:
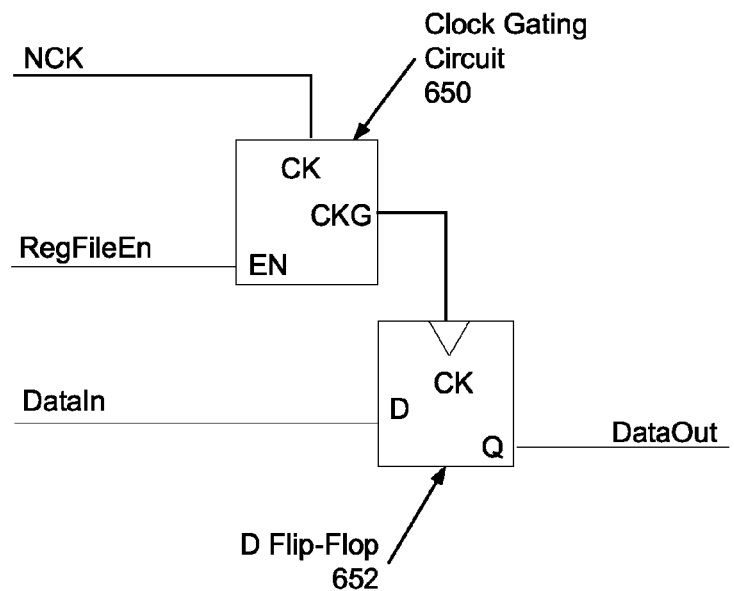
FIG. 6C is a generalized block diagram illustrating one embodiment of a clock enabled data driver for a register file.

Referring to FIG. 6C, a circuit for data drivers 620 is shown. Each circuit corresponds to a 1-bit vertical column of the data portion of each entry 612 of memory array 610. For example, the circuit shown may drive a vertical line to bit 17 of each entry 612. The particular entry 612 to be written with the data stored in bit 17 of the data drivers 620 is determined by the decoder 602 output. The circuit in FIG. 6C will drive the new input data, DataIn, which will be written into one entry 612 in the column. Again, a pair of CMOS inverters may follow flip-flop 652 in order to buffer the output signal DataOut. CGC 650 is used to disable the clock to flip-flop 652. Each bit of the data drivers 620 has the ability to have the clock signal disabled in this manner.

Figure 7:
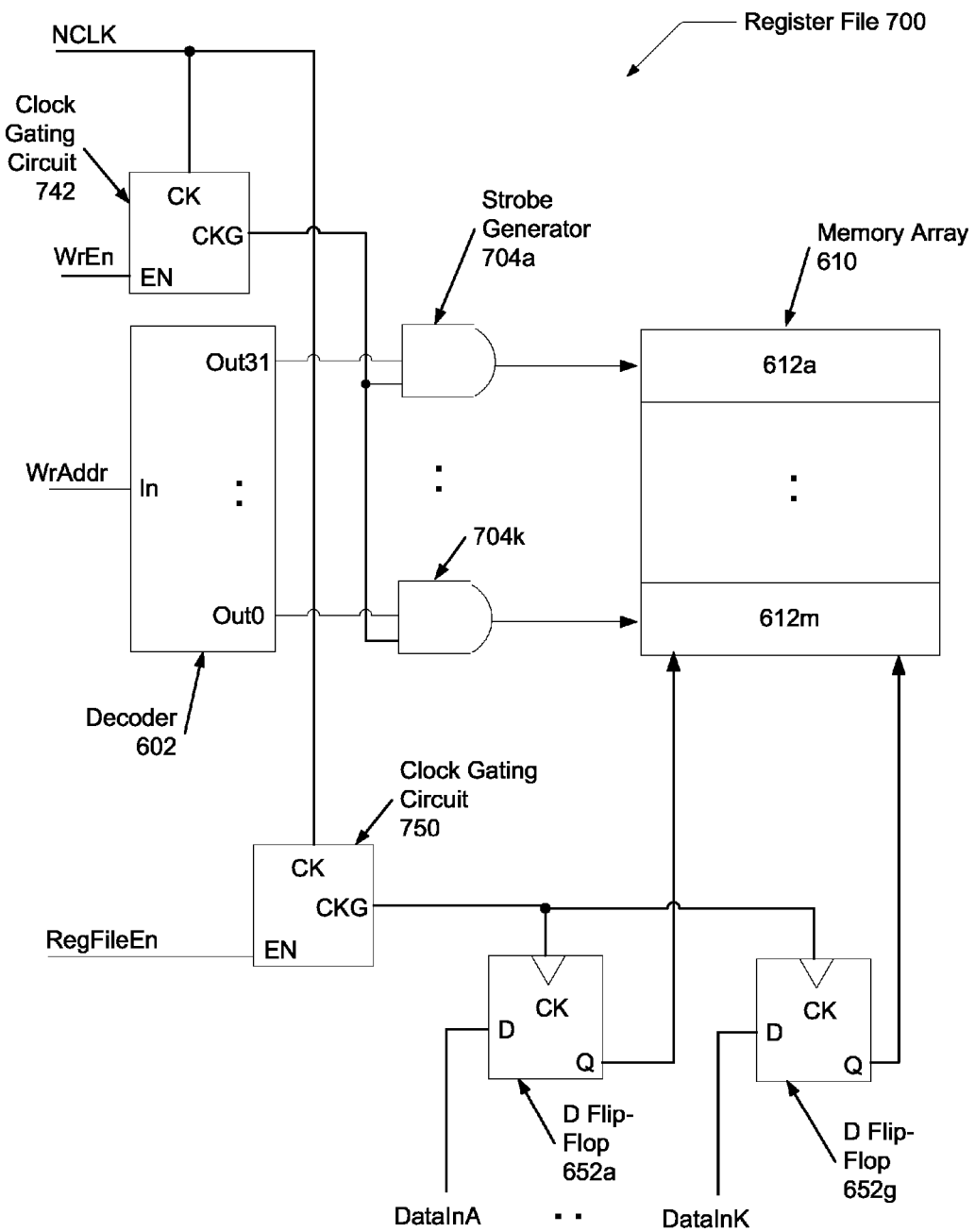
FIG. 7 is a generalized block diagram illustrating one embodiment of a clock enabled register file built by a method to reduce power and area of clock enabled circuits.

FIG. 7 illustrates a generalized block diagram of a register file 700. CGC's 742 and 750 are placed within the floorplan to drive a gated clock signal to the strobe generators 704 and flip-flops 652, respectively. This is according to block 508 of method 500. The storage elements, or the six-transistor cells within memory array 610, do not receive a unique enable signal (decision block 510) and the input data is still driven directly to memory array 610 as before (block 514). The strobe generators 704 only include a 2-input AND gate now and no CGC. The logic gate is used to qualify the gated clock with the decoder output.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a register array, wherein the register array comprises a plurality of one bit storage element cells;
   clock enabling circuitry; and
   clock generation circuitry, wherein the clock generation circuitry is configured to provide a clock signal from a last ungated stage;
   wherein the clock enabling circuitry is configured to:
      receive the clock signal from the last ungated stage;
      receive a common clock enable signal corresponding to the plurality of one bit storage element cells; and
      provide a gated clock signal to the plurality of one bit storage element cells, in response to detecting the common clock enable signal is asserted;
   wherein each of the storage element cells is coupled to receive the gated clock signal, a unique enable signal, and a data input signal, and wherein each cell of said cells comprises:
      a storage element configured to store a current state of the cell; and
      a multiplexer configured to:
         receive as input the data input signal and a current value of the cell; and
         receive as a select signal the unique enable signal, wherein the unique enable signal selects either the data input signal or the current value of the cell for output; and
         convey as output a next state for said storage element.

2. The system as recited in claim 1, wherein the clock enabling circuitry comprises a single clock gating circuit.

3. The system as recited in claim 2, further comprising a power reduction control unit configured to determine when the last ungated stage is enabled, wherein the power reduction control unit conveys the common enable signal to the single clock gating circuit.

4. The system as recited in claim 3, wherein each storage element cell is directly coupled to input data to be stored.

5. The system as recited in claim 1, wherein each storage element cell is configured to provide new data as the input value of the storage element cell in response to detecting the common enable signal is asserted and the corresponding unique enable signal is asserted.

6. The system as recited in claim 3, wherein the clock gating circuit comprises:
   a level-sensitive latch configured to receive the last ungated stage clock signal and the common enable signal; and
   a logic gate configured to receive the output of the level-sensitive latch and the last ungated stage clock signal, and in response, provide a gated clock signal to the storage element cells.

7. A method comprising:
   providing a clock signal from a last ungated stage of a clock generation circuitry to a clock enabling circuitry within register array, the register array comprising a plurality of one bit storage element cells;

receiving in clock enabling circuitry the last ungated stage clock signal, and a common lock enable signal;

providing a gated clock signal to the plurality of one bit storage element cells, in response to detecting the common clock enable signal is asserted;

wherein each of the storage element cells is coupled to receive the gated clock signal, a unique enable signal, and a data input signal, and wherein each cell of said cells comprises:

a storage element configured to store a current state of the cell; and a multiplexer:

receiving as input the data input signal and a current value of the cell; and receiving as a select signal the unique enable signal, wherein the unique enable signal selects either the data input signal or the current value of the cell for output; and conveying as output a next state for said storage element.

8. The method as recited in claim 7, wherein the clock enabling circuitry comprises a single clock gating circuit.

9. The method as recited in claim 8, further comprising conveying the common enable signal to the single clock gating circuit.

10. The method as recited in claim 9, further comprising directly coupling each storage element cell to input data to be stored.

11. The method as recited in claim 9, further comprising receiving unique enable signals, each unique enable signal corresponding to a single storage element cell.

12. The method as recited in claim 11, further comprising providing an output value of the storage element cell as the input value of the storage element cell in response to the common enable signal is asserted and the corresponding unique enable signal is deasserted.

13. The method as recited in claim 11, further comprising providing new data as the input value of the storage element cell in response to the common enable signal is asserted and the corresponding unique enable signal is asserted.

14. The method as recited in claim 9, further comprising:

receiving the last ungated stage clock signal and the common enable signal by a level-sensitive latch within the clock gating circuit; and receiving the output of the level-sensitive latch and the last ungated stage clock signal by a logic gate, and in response, providing a gated clock signal to the storage element cells.

15. A processor comprising:

a power reduction control unit;

a register array, wherein the register array comprises a plurality of one bit storage element cells;

clock enabling circuitry; and clock generation circuitry, wherein the clock generation circuitry is configured to provide a clock signal from a last ungated stage wherein the clock enabling circuitry is configured to:

receive the clock signal from the last ungated stage;

receive a common clock enable signal corresponding to the plurality of one bit storage element cells; and provide a gated clock signal to the plurality of one bit storage element cells, in response to detecting the common clock enable signal is asserted;

wherein each of the storage element cells is coupled to receive the gated clock signal, a unique enable signal, and a data input signal, and wherein each cell of said cells comprises:

a storage element configured to store a current state of the cell; and a multiplexer configured to:

receive as input the data input signal and a current value of the cell; and receive as a select signal the unique enable signal, wherein the unique enable signal selects either the data input signal or the current value of the cell for output; and convey as output a next state for said storage element.

16. The processor as recited in claim 15, wherein the clock gating enabling circuitry is further configured to receive unique enable signals, each unique enable signal corresponding to a single storage element cell.

17. The processor as recited in claim 16, wherein the clock gating enabling circuitry is further configured to provide an output value of the storage element cell as the input value of the storage element cell in response to the common enable signal is asserted and the corresponding unique enable signal is deasserted.

18. The processor as recited in claim 17, wherein the clock gating enabling circuitry is further configured to provide new data as the input value of the storage element cell in response to the common enable signal is asserted and the corresponding unique enable signal is asserted.

* * * * *